(12) United States Patent
Carminati et al.

(10) Patent No.: US 11,788,593 B2
(45) Date of Patent: Oct. 17, 2023

(54) METHOD OF MAKING A BRAKE DISC AND BRAKE DISC FOR A DISC BRAKE

(71) Applicant: BREMBO S.p.A., Curno (IT)

(72) Inventors: Fabiano Carminati, Curno (IT); Simone Biondo, Curno (IT); Alessandro Mancini, Curno (IT); Federico Bertasi, Curno (IT)

(73) Assignee: Brembo S.p.A., Bergamo (IT)

( * ) Notice: Subject to any disclaimer, the term of this patent is extended or adjusted under 35 U.S.C. 154(b) by 320 days.

(21) Appl. No.: 17/416,600

(22) PCT Filed: Dec. 12, 2019

(86) PCT No.: PCT/IB2019/060719
§ 371 (c)(1),
(2) Date: Jun. 21, 2021

(87) PCT Pub. No.: WO2020/128740
PCT Pub. Date: Jun. 25, 2020

(65) Prior Publication Data
US 2022/0065313 A1    Mar. 3, 2022

(30) Foreign Application Priority Data

Dec. 21, 2018 (IT) .................. 102018000020773

(51) Int. Cl.
*F16D 65/12* (2006.01)
*C23C 4/02* (2006.01)
(Continued)

(52) U.S. Cl.
CPC .............. *F16D 65/125* (2013.01); *C23C 4/02* (2013.01); *C23C 4/08* (2013.01); *F16D 65/127* (2013.01);
(Continued)

(58) Field of Classification Search
CPC ... F16D 65/125–128; F16D 2200/0013; F16D 2200/0021; F16D 2250/0046;
(Continued)

(56) References Cited

U.S. PATENT DOCUMENTS 4,715,486 A    12/1987   Burgdorf et al.
5,612,110 A *  3/1997   Watremez ............. F16D 69/027
                                                        428/614
(Continued)

FOREIGN PATENT DOCUMENTS

DE    102007027933 A1    1/2008
DE    102009008114 A1    8/2010
(Continued)

OTHER PUBLICATIONS

Italian Patent and Trademark Office, Ministry of Economic Development, Italian Search Report, issued in IT 201800020773, Sep. 16, 2019, 2 pages, Rome, Italy.
(Continued)

*Primary Examiner* — Christopher P Schwartz
(74) *Attorney, Agent, or Firm* — Marshall & Melhorn, LLC

(57) ABSTRACT

A method for making a brake disc may include the following steps: a) preparing a brake disc having a braking band provided with two opposite braking surfaces, (b) subjecting at least one of the braking surfaces to a working process adapted to increase the surface roughness thereof; c) nitrocarburizing the braking surface with increased surface roughness to obtain on the surface a nitrocarburized surface layer; (d) depositing on the nitrocarburized surface layer a material in particle form having: —Cr3C2 and NiCr, or —NiCr, Fe, Mo, Co, Mn and Al, which forms a base protective coating; and e) depositing on the base protective coating a material in particle form consisting of WC, Fe, Cr
(Continued)

and Al, thus forming a surface protective coating of WC and Fe, Cr and Al.

22 Claims, 3 Drawing Sheets

(51) Int. Cl.
   *C23C 4/08* (2016.01)
   *C23C 4/129* (2016.01)
(52) U.S. Cl.
   CPC ...... *C23C 4/129* (2016.01); *F16D 2200/0013* (2013.01); *F16D 2200/0021* (2013.01); *F16D 2250/0046* (2013.01); *F16D 2250/0053* (2013.01)
(58) Field of Classification Search
   CPC ..... F16D 2250/0053; C23C 4/02; C23C 4/08; C23C 4/129
   USPC .................................................. 188/218 XL
   See application file for complete search history.

(56) References Cited

U.S. PATENT DOCUMENTS

| | | | |
|---|---|---|---|
| 8,287,667 | B2 | 10/2012 | Holly et al. |
| 8,585,833 | B2 | 11/2013 | Holly et al. |
| 8,877,296 | B2 | 11/2014 | Lembach et al. |
| 9,651,105 | B2 * | 5/2017 | Holly .................... F16D 69/02 |
| 9,879,740 | B2 | 1/2018 | Tironi et al. |
| 11,035,427 | B2 | 6/2021 | Carminati et al. |
| 11,661,985 | B2 * | 5/2023 | Carminati ................. C23C 4/10 |
| | | | 188/218 XL |
| 2009/0026027 | A1 * | 1/2009 | Martino ................ F16D 65/125 |
| | | | 188/218 XL |
| 2013/0177437 | A1 * | 7/2013 | Amancherla ............ C23C 4/02 |
| | | | 416/241 R |
| 2016/0130705 | A1 * | 5/2016 | Nardi ..................... C23C 28/36 |
| | | | 427/404 |
| 2016/0178019 | A1 * | 6/2016 | Stephenson ........... F16D 65/127 |
| | | | 188/218 XL |
| 2017/0122392 | A1 * | 5/2017 | Lem ........................ F16D 69/04 |
| 2019/0056003 | A1 * | 2/2019 | Carminati ............. F16D 65/125 |
| 2023/0018275 | A1 * | 1/2023 | Giammarinaro ...... F16D 65/123 |

FOREIGN PATENT DOCUMENTS

| | | | |
|---|---|---|---|
| DE | 102014015474 A1 | 4/2016 | |
| DE | 102016200951 A1 * | 7/2017 | ........... F16D 65/123 |
| WO | WO2014/097186 A1 | 6/2014 | |
| WO | WO2014097187 A2 | 6/2014 | |
| WO | WO2017046681 A1 | 3/2017 | |

OTHER PUBLICATIONS

European Patent Office, International Search Report with Written Opinion, issued in PCT/IB2019/060719, dated Feb. 19, 2020, 11 pages, European Patent Office, Rijswijk, Netherlands.

* cited by examiner

METHOD OF MAKING A BRAKE DISC AND BRAKE DISC FOR A DISC BRAKE

FIELD OF APPLICATION

The present invention relates to a method for making a brake disc and to a brake disc for disc brakes.

BACKGROUND ART

A brake disc of a disc braking system of a vehicle comprises an annular structure, or braking band, and a central fixing element, known as the bell, by means of which the disc is fixed to the rotating part of a vehicle suspension, e.g. a hub. The braking band is provided with opposed braking surfaces adapted to cooperate with friction elements (brake pads), accommodated in at least one caliper body placed straddling the braking band and integral with a non-rotating component of the vehicle suspension. The controlled interaction between the opposing brake pads and the opposite braking surfaces of the braking band determine a braking action by friction which allows the deceleration or stopping of the vehicle.

Generally, the brake disc is made of grey cast iron or steel. Indeed, this material allows to obtain good braking performance (especially in terms of wear containment) at relatively low cost. Discs made of carbon or carbo-ceramic materials offer much greater performance, but at a much higher cost.

The limits of traditional discs, made of cast iron or steel, are related to excessive wear. As regards discs made of grey cast iron, another very negative aspect is related to excessive surface oxidation, with consequent formation of rust. This aspect impacts both the performance of the brake disc and its appearance because the rust on the brake disc is aesthetically unacceptable for users. Attempts have been made to tackle such problems by providing the discs made of grey cast iron or steel with a protective coating. The protective coating, on the one hand, reduces disc wear, and on the other, protects the grey cast iron base from surface oxidation, thereby preventing the formation of a layer of rust. The protective coatings currently available and applied on discs, while offering wear resistance, are however subject to flaking which determine their detachment from the disc itself.

The protective coatings currently available and applied on grey cast iron or steel discs, while offering wear resistance, are however subject to flaking which determine their detachment from the disc itself.

A protective coating of this type is described, for example, in patent U.S. Pat. No. 4,715,486, related to a low-wear disc brake. The disc, made in particular of cast iron, has a coating made of a particle material deposited on the disc by high kinetic energy impacting technique. According to a first embodiment, the coating contains from 20% to 30% of tungsten carbide, 5% of nickel and the remaining part of a mixture of chromium carbides and tungsten. According to a second embodiment, the coating contains from 80% to 90% of tungsten carbide, up to 10% of cobalt, up to 5% of chromium and up to 5% of carbon.

In the case of application of the coating by thermal spray techniques, one of the causes of the detachment of the conventional protective coatings from discs made of grey cast iron or steel is the presence of free carbon in the protective coating. Indeed, the carbon tends to burn, combining with the oxygen incorporated in the protective coating being formed. This leads to the formation of micro-bubbles within the coating, which can prevent an adequate adhesion of the coating onto the disc, thereby facilitating its removal.

From the above, it is apparent that the discs made of grey cast iron or steel provided with protective coatings cannot be currently used in the field of braking systems.

However, taking into account the advantages in terms of wear resistance guaranteed by the protective coatings, the need is strongly felt in the field to solve the drawbacks mentioned above with reference to the prior art. In particular, the need is felt to have grey cast iron or steel discs provided with protective coatings which can increase the wear resistance of the disc and which are also strong over time.

A solution to the aforesaid problems was suggested by the Applicant in International application WO2014/097187 for discs made of grey cast iron or steel.

In the case of discs made of grey cast iron or steel, it consists in making a protective coating on the braking surfaces of a disc brake obtained by depositing a material in particle form consisting of 70 to 95% by weight of tungsten carbide, from 5% to 15% by weight of cobalt and from 1% to 10% by weight of chromium. The deposition of the material in particle form is obtained by means of HVOF (High-Velocity Oxygen Fuel) or HVAF (High-Velocity Air Fuel) or KM (Kinetic Metallization) techniques.

More in detail, according to the solution offered in WO2014/097187 the combination of the HVOF, HVAF or KM deposition techniques and of the chemical components used for forming the coating allows to obtain a protective coating with high bond strength, which ensures a high degree of anchoring on grey cast iron or steel. The particle material used does not contain free carbon (C), not even in trace form. This allows to reduce the flaking phenomena of protective coating significantly.

The adoption of the solution offered in WO2014/097187 for discs made of grey cast iron or steel or in WO2014/097186 for discs made of aluminum or aluminum alloy allows to significantly reduce the protective coating flaking phenomena found in the known prior art, but not to eliminate them completely. Indeed, even in discs made of aluminum or aluminum alloy or cast iron or steel provided with a protective coating made according to WO2014/097186 or WO2014/097187, flaking and collapse of the protective coating continue to occur, albeit at a lesser frequency than in the known prior art.

A partial solution to the problem of flaking and collapse of the protective coating has been offered by the Applicant in International application WO2017046681A1. In particular, such solution provides making a base protective coating between the protective coating and the braking surfaces consisting of 65% to 95% of chromium carbide (Cr3C2) and for the remainder of nickel-chromium (NiCr). The surface protective coating made on the base protective coating consists of 80 to 90% by weight of tungsten carbide (WC) and the remainder of cobalt (Co). The deposition of the material in particle form for both protective coatings is obtained by means of HVOF (High-Velocity Oxygen Fuel) or HVAF (High-Velocity Air Fuel) or KM (Kinetic Metallization) techniques. Such a solution is applied in particular to discs made of grey cast iron or steel.

With respect to the prior art, the technical solution offered by WO2017046681A1 offers significant improvements in terms of reduction of collapse and flaking of protective coatings. However, the results which can be achieved are not entirely satisfactory.

Therefore, in the reference field, the need for discs made of grey cast iron or steel provided with protective coatings which are not subject to flaking or which are subject thereto to a much lesser degree than the known solutions continues to exist, so as to ensure wear resistance over time.

PRESENTATION OF THE INVENTION

The need for discs provided with protective coatings which are not subject to flaking or are subject to it to a much lesser degree than the currently known solutions, so as to guarantee wear resistance over time is met by a method for making a brake disc in accordance with claim 1 and by a brake disc for disc brakes according to claim 14.

DESCRIPTION OF THE DRAWINGS

Further features and advantages of the present invention will become more apparent from the following description of preferred embodiments given by way of non-limiting examples, in which.

Elements or parts in common to the embodiments described below will be indicated using the same reference numerals.

DETAILED DESCRIPTION

Figure 1:
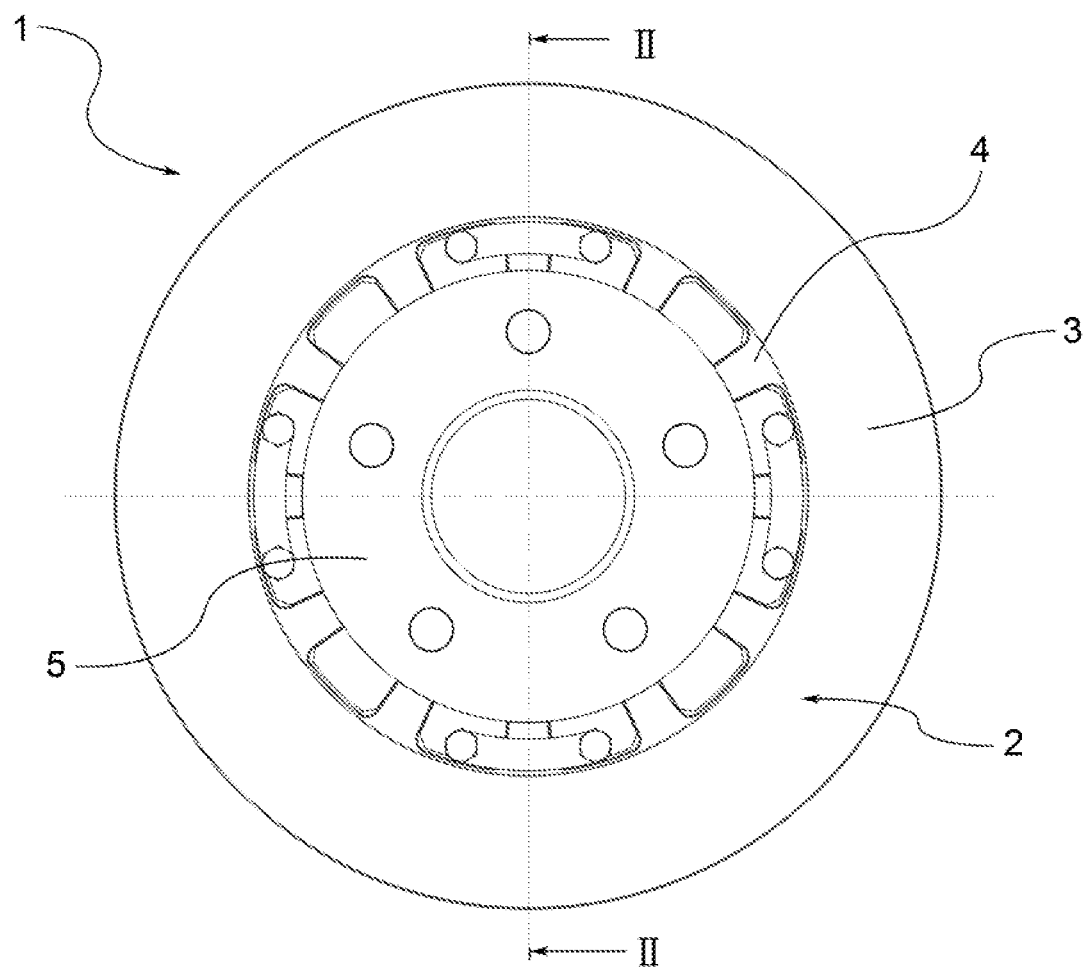
FIG. 1 shows a top plan view of a disc brake according to an embodiment of the present invention.

With reference to the aforesaid figures, reference numeral 1 indicates a brake disc as a whole according to the present invention.

According to a general embodiment of the invention, shown in the accompanying figures, the disc brake 1 comprises a braking band 2, provided with two opposite braking surfaces 2a and 2b, each of which at least partially defines one of the two main faces of the disc.

The braking band 2 consists of a base metal chosen from grey cast iron or steel. Preferably, the braking band is made of grey cast iron. In particular, the entire disc is made of grey cast iron. Therefore, in the following description, reference will be made to a disc made of grey cast iron, without however excluding the possibility of it being made of steel.

The disc 1 is provided with:
a base protective coating 30 which covers at least one of the two braking surfaces of the braking band; and
a surface protective coating 3 which covers at least one of the two braking surfaces of the braking band and is made to cover the aforesaid base protective coating 30.

The base protective coating 30 consists of chromium carbide ($Cr_3C_2$) and nickel-chromium (NiCr), or of nickel-chromium (NiCr), iron (Fe), molybdenum (Mo), cobalt (Co), manganese (Mn) and aluminum (Al), and is obtained by depositing the components of the coating in particle form on the disc 1 with a spray deposition technique, preferably HVOF (High-Velocity Oxygen Fuel) technique, or HVAF (High-Velocity Air Fuel) technique or KM (Kinetic Metallization) technique.

The surface protective coating 3 consists of tungsten carbide (WC), iron (Fe), chromium (Cr) and aluminum (Al) is obtained by depositing tungsten carbide (WC), iron (Fe), chromium (Cr) and aluminum (Al) in particle form on the base protective coating 30 by means of spraying technique, preferably with HVOF (High-Velocity Oxygen Fuel) technique or by HVAF (High-Velocity Air Fuel) technique or by KM (Kinetic Metallization) technique.

Figure 2:
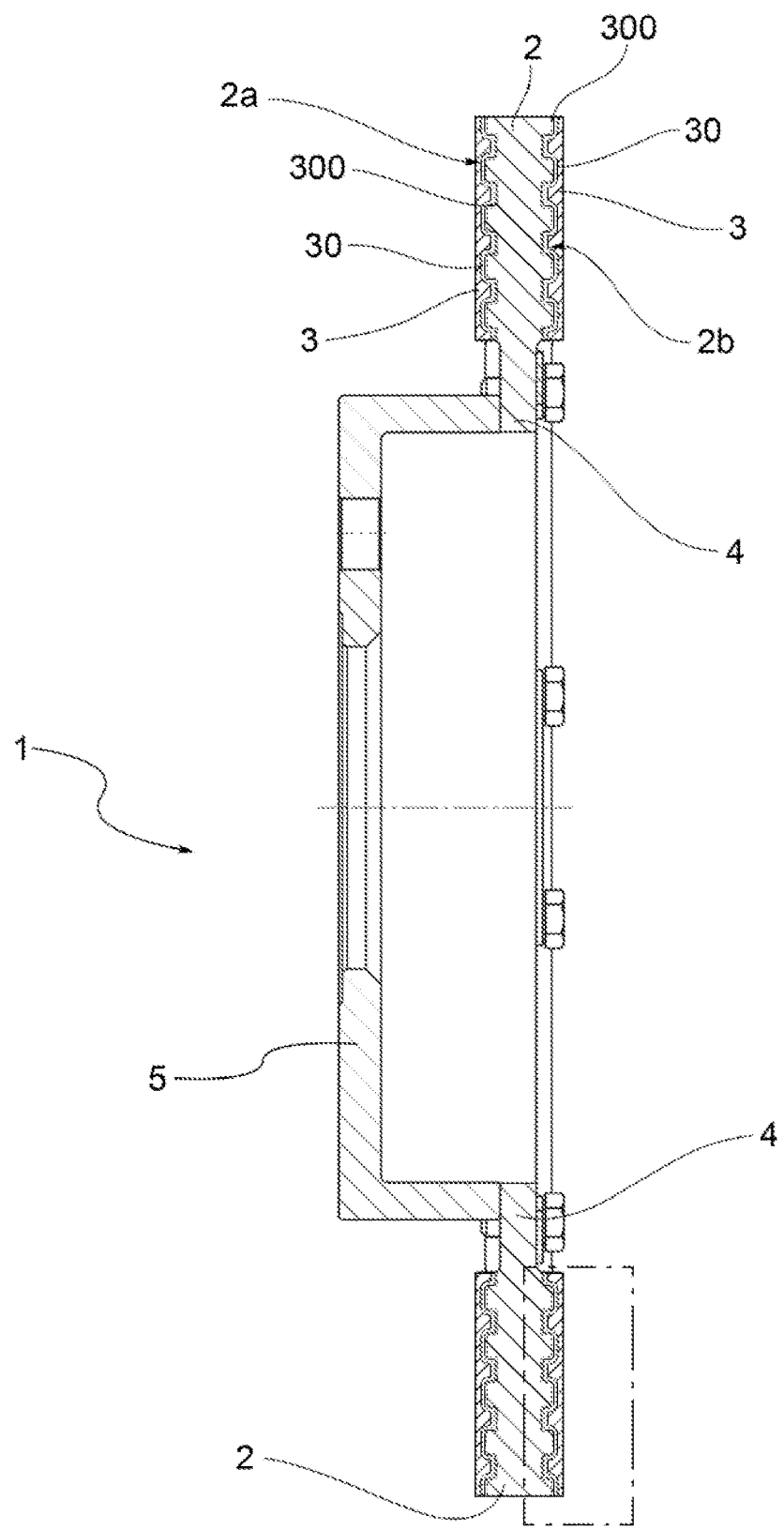
FIG. 2 shows a view of the disc in FIG. 1 taken along the section line II-II indicated thereon, in which the braking band is diagrammatically shown, without respecting the real proportions of the coating layers and the roughness profile, in order to make their features graphically appreciable.
Figure 3:
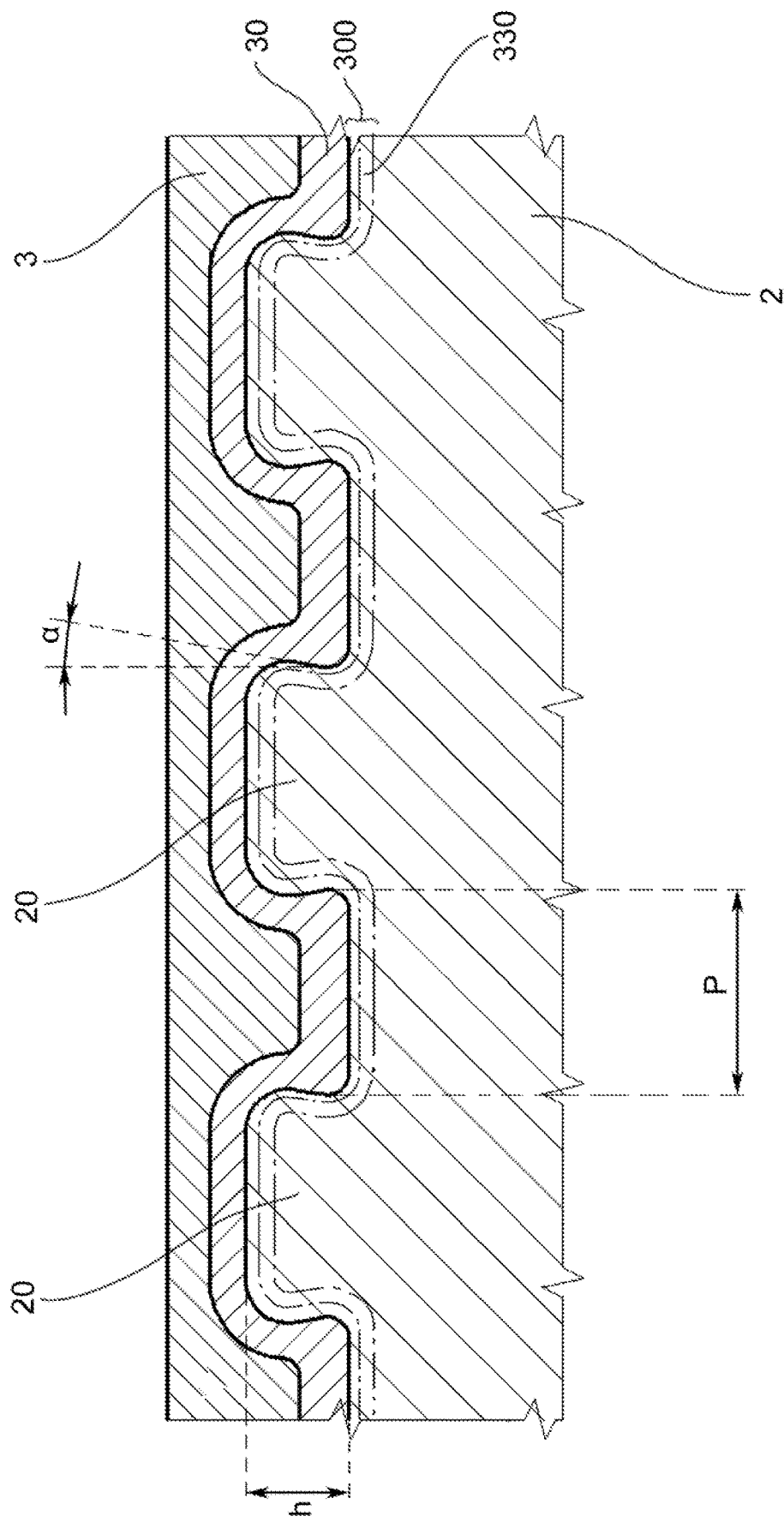
FIG. 3 shows an enlarged detail of FIG. 2, relating to a portion of the braking band indicated in the box shown there.

According to the invention, as diagrammatically shown in FIGS. 2 and 3, the braking surface coated by the aforesaid base protective coating 3 is defined by a nitrocarburized layer 300 of the base metal (grey cast iron or steel) and has a rough profile in radial or circumferential cross-section with respect to the center of the braking band.

The protective base layer 30 is therefore fixed not directly onto the base metal which forms the braking band, but is fixed on the aforementioned nitrocarburized base metal layer 300.

In particular, the aforesaid rough profile is defined by a plurality of protuberances 20 which extend orthogonally to the surface with a height between 30 and 200 μm and are mutually spaced apart—in a radial or circumferential direction with respect to the center of the braking band—with a pitch between 300 and 2000 μm. Preferably, the aforesaid protuberances are distributed in a regular pattern on the braking surface of disc 1. However, an irregular distribution pattern may also be provided.

Advantageously, as diagrammatically shown in FIG. 3, the aforesaid protuberances 20 have an undercut angle α with respect to the direction orthogonal to the surface from which they extend. Preferably, the aforesaid undercut angle α is between 2° to 15°.

According to an alternative embodiment, the aforesaid rough profile may have a roughness Ra between 0.8 and 2, if obtained by turning, or a roughness Rz between 10 and 80, if obtained by sandblasting.

Preferably, the aforesaid nitrocarburized layer 300 is obtained by a ferritic nitrocarburization treatment of the base metal.

According to a preferred embodiment, the nitrocarburized layer 300 has a depth between 2 and 30 μm and hardness values higher than 300 HV in microhardness.

According to a particularly preferred embodiment, the aforesaid nitrocarburized layer 300 comprises an oxidized top layer 330 comprising magnetite $Fe_3O_4$ which acts as an interface with the aforesaid protective base layer 30.

Preferably, the aforementioned oxidized top layer 330 comprising magnetite $Fe_3O_4$ has a thickness between 2 and 10 μm.

Preferably, the base protective coating (30) consists of:
65% to 95% of chromium carbide ($Cr_3C_2$) and the remainder of nickel-chromium (NiCr); or
nickel-chromium (NiCr) with a content by weight of nickel (Ni) from 40% to 75% and a content by weight of chromium (Cr) from 14% to 30%, and the remainder of iron (Fe), molybdenum (Mo), cobalt (Co), manganese (Mn) and aluminum (Al).

In particular, the base protective coating 30 may have the following compositions:
93% by weight of chromium carbide ($Cr_3C_2$) and 7% of nickel-chromium (NiCr);
90% by weight of chromium carbide ($Cr_3C_2$) and 10% of nickel-chromium (NiCr);
75% by weight of chromium carbide ($Cr_3C_2$) and 25% of nickel-chromium (NiCr); or
65% by weight of chromium carbide ($Cr_3C_2$) and 35% of nickel-chromium (NiCr).

Preferably, the base protective coating 30 consists of 75% by weight of chromium carbide ($Cr_3C_2$) and of 25% of nickel-chromium (NiCr). In particular, the nickel-chromium (NiCr) consists of 80% of nickel and of 20% chromium.

Preferably, the surface protective coating 3 consists of 75% to 87% by weight of tungsten carbide (WC) and iron (Fe), chromium (Cr) and aluminum (Al) for the remainder. Even more preferably, the surface protective coating 3 consists of 85% by weight of tungsten carbide (WC) and 15% by weight of iron (Fe), chromium (Cr) and aluminum (Al).

Advantageously, the base protective coating 20 has a thickness between 20 μm and 80 μm, and preferably equal to 50 μm, while the surface protective coating 3 has a thickness between 30 μm and 90 μm, and preferably equal to 60 μm. The thickness of the two protective coatings 3 and 30 is calculated in relation to the portions of the coating above the rough state. These are therefore minimum thickness values which do not take into account the thickness of the coating which may be used to fill the dips/pits of the roughness.

As a whole, as diagrammatically shown in FIG. 3, the two protective coatings 3 and 30 completely fill the roughness of the braking surface and develop on the rough profile with layers of thickness preferably within the intervals specified above.

It has been surprisingly found that the presence of the aforesaid nitrocarburized layer 300 at the interface between the unmodified base metal and the base protective coating 30 allows a significant reduction, if not a complete cancellation, of the occurrence of coating flaking phenomena, compared to brake discs with similar protective coatings but without a nitrocarburized layer.

A possible technical explanation, which is in all cases non-limiting, is based on the fact that, unlike traditional protective coatings, the nitrocarburized layer protects the base metal from corrosion without, however, being made up of a layer of material applied onto the base metal itself. In other words, there is no net separation surface between the unmodified base metal and the nitrocarburized layer 300. The nitrocarburized layer is indeed a layer of the base metal morphologically and chemically modified by a process of nitrocarburization. Therefore, the transition from unmodified base metal to nitrocarburized metal may be progressive.

From this point of view, the roughness profile of the braking surface, in correspondence of which the nitrocarburized layer 300 is made, further accentuates the irregularity in the transition from nitrocarburized to the unmodified base metal, thereby boosting the positive effects.

The roughness profile of the braking surface, in correspondence of which the nitrocarburized layer 300 is made, further facilitates the mechanical adhesion of the base protective layer 30 to the nitrocarburized layer.

It has also been experimentally verified that the presence of the nitrocarburized layer 300 does not affect the performance of the surface protective coating 3 in terms of both wear resistance and tribological behavior (friction, fading, running-in) under normal environmental conditions.

Finally, it has been experimentally verified that the presence of the nitrocarburized layer 300 improves resistance in the presence of environmental stresses (thermal shocks and salt attacks).

The anti-corrosion action offered by the nitrocarburized layer is accentuated in the preferred case in which the nitrocarburized layer 300 comprises an oxidized top layer 330 comprising magnetite $Fe_3O_4$.

Such an anti-corrosion action is in any case further enhanced by the presence of the base coating layer 30. By virtue of the composition of such a base protective coating 30 ($Cr3C2$ and NiCr, or NiCr, Fe, Mo, Co, Mn and Al) and the deposition method, such a base coating 30 also has an anti-corrosive effect on the braking surface of the disc.

The anti-corrosive action benefits the integrity and the adhesion of the surface protective coating 3 to the disc.

The base protective coating 30 also performs a mechanical "damper" function for the surface protective (anti-wear) coating 3. Indeed, the base protective coating 30 consisting of $Cr3C2$ and NiCr or of NiCr, Fe, Mo, Co, Mn and Al has a higher degree of ductility than the surface protective coating 3 consisting of tungsten carbide, iron, chromium and aluminum. This confers an elastic behavior to the base layer 30 which helps mitigate—at least in part—the stresses imparted to the disc when in use. Therefore, the base protective coating 30 acts as a sort of damper or cushion between the disc and the surface protective coating 3. This prevents direct transmission of stresses between the two parts, thereby reducing the risk of triggering of cracks in the surface protective coating 3.

As regards the anti-wear function, the surface protective coating 3 is influenced neither by the presence of the base protective coating 30 nor by the nitrocarburized layer 300 (possibly with oxidized top layer 330).

For the sake of simplicity, the brake disc 1 will now be described together with the method according to the present invention.

The brake disc 1 is made preferably, but not necessarily, with the method according to the invention described below.

According to a general implementation of the method according to the invention, the method comprises the following operating steps:

step a): preparing a brake disc, comprising a braking band 2 provided with two opposite braking surfaces 2a, 2b, each of which defines at least partially one of the two main faces of the disc, the braking band being made of grey cast iron or steel;

step b): subjecting at least one of said braking surfaces 2a or 2b to a working process designed to increase the surface roughness thereof;

step c): nitrocarburizing the braking surface with increased surface roughness obtaining on such a surface a nitrocarburized surface layer 300;

step d): depositing on the nitrocarburized surface layer (300) a material in particle form consisting of:

chromium carbide ($Cr3C2$) and nickel-chromium (NiCr), or nickel-chromium (NiCr), iron (Fe), molybdenum (Mo), cobalt (Co), manganese (Mn) and aluminum (Al), with a spray deposition technique, preferably HVOF (High-Velocity Oxygen Fuel) technique or HVAF (High-Velocity Air Fuel) technique or KM (Kinetic Metallization) technique, forming a base protective coating 30 which covers at least one of the two braking surfaces of the braking band with the interposition of said nitrocarburized layer 300; and step e): depositing on the base protective coating (30) a material in particle form consisting of tungsten carbide (WC), iron (Fe), chromium (Cr) and aluminum (Al), with a spray deposition technique, preferably HVOF (High-Velocity Oxygen Fuel) technique, or HVAF (High-Velocity Air Fuel) technique or KM (Kinetic Metallization) technique, forming a surface protective coating 3 which consists of tungsten carbide (WC) and iron (Fe), chromium (Cr) and aluminum (Al) and which covers at least one of the two braking surfaces of the braking band.

Preferably, the working process performed in step b) may be carried out to generate on the aforesaid surface a rough profile defined by a plurality of protuberances 20 which extend orthogonally to the surface with a height h between 30 and 200 µm and are mutually spaced apart—in a radial or circumferential direction with respect to the center of the braking band—with a pitch P between 300 and 2000 µm.

Advantageously, such protuberances 20 have an undercut angle α with respect to the direction orthogonal to the surface from which they extend. Preferably, such an undercut angle α is between 2° and 15°, even more preferably equal to 10°. The presence of the undercut angle α increases the mechanical adhesion capacity of the basic protective coating 30 on the nitrocarburized layer 300.

In particular, the aforesaid step b) is carried out by chip removal or by laser engraving or by plastic deformation.

Advantageously, alternatively to the aforesaid step b) maybe is carried out with a working process by fine turning with roughness Ra between 0.8 and 2.

According to a further alternatively, the aforesaid step b) is carried out with a working process by sandblasting with roughness Rz between 10 and 80.

Preferably, the step (c) of nitrocarburization is obtained by a ferritic nitrocarburization treatment.

Advantageously, the nitrocarburization step c) is carried out so that the nitrocarburized surface layer 300 has a depth between 2 and 30 µm and hardness values higher than 300 HV in microhardness.

According to a preferred embodiment of the method according to the invention, step c) of nitrocarburizing is followed by a step f) of post-oxidation of the nitrocarburized layer 300, carried out before step d) of deposition, to obtain an oxidized top layer 330 comprising magnetite $Fe_3O_4$.

Preferably, the oxidized top layer 330 comprising magnetite ($Fe_3O_4$) has a thickness between 2 and 10 µm.

The presence of the oxidized top layer 330 comprising magnetite ($Fe_3O_4$) enhances the anti-corrosive action of the nitrocarburized layer on the unmodified base metal.

Nitrocarburization is a process well known per se to those skilled in the art and will therefore not be described in detail. Here we limit ourselves to providing some general information for clarification.

Nitrocarburization is a thermochemical surface hardening process conducted in ferritic phase at relatively low temperatures (550° C.-580° C.) and under conditions such as to obtain a diffusion of nitrogen and carbon in the surface area of the piece. In particular, the means adopted in implementing the process of diffusion of nitrogen and carbon are salt baths; gas; plasma.

Nitrocarburization with a gaseous medium is preferred over nitrocarburization in a salt bath when a high degree of uniformity and cleanliness is sought (blind cavities, grooves, threads, etc.).

The temperatures adopted in the nitrocarburization process guarantee the containment of deformations.

As an alternative to ferritic nitrocarburization, an ion nitrocarburization can be implemented. The latter differs from the ferritic one essentially for the temperature, which is 570° C., and the atmosphere, which is made up of ammonia and methane.

With the ion nitrocarburization process, it is possible to vary the type of surface constituent as well as the depth at will. It is therefore possible to determine the formation of layers ($Fe_4N$) or ($Fe_{2-3}C_xN_y$) in the case of components (such as brake discs) which must to withstand fatigue and/or wear.

Preferably, the material in particle form deposited in step d) of depositing for making the base protective coating 30 consists of 65% to 95% of chromium carbide ($Cr_3C_2$) and nickel-chromium (NiCr) for the remainder.

In particular, the material in particle form deposited in step b) of depositing to make the base protective coating 30 may have the following compositions:
- 93% by weight of chromium carbide ($Cr_3C_2$) and 7% of nickel-chromium (NiCr);
- 90% by weight of chromium carbide ($Cr_3C_2$) and 10% of nickel-chromium (NiCr);
- 75% by weight of chromium carbide ($Cr_3C_2$) and 25% of nickel-chromium (NiCr); or
- 65% by weight of chromium carbide ($Cr_3C_2$) and 35% of nickel-chromium (NiCr).

According to a preferred embodiment, the material in particle form deposited in step d) of depositing for making the base protective coating 30 consists of 75% by weight of chromium carbide ($Cr_3C_2$) and 25% of nickel-chromium (NiCr). In particular, the nickel-chromium (NiCr) consists of 80% of nickel and of 20% chromium.

Alternatively, the material in particle form deposited in the deposition step d) to make the base protective coating 30 is based on nickel-chromium (NiCr) with a content by weight of nickel (Ni) from 40% to 75% and with a content by weight of chromium (Cr) from 14% to 30%, and for the remainder of iron (Fe), molybdenum (Mo), cobalt (Co), manganese (Mn) and aluminum (Al).

Preferably, the material in particle form deposited in step e) of depositing for making the surface protective coating 3 consists of 75% to 87% by weight of tungsten carbide (WC) and iron (Fe), chromium (Cr) and aluminum (Al) for the remainder.

In particular, the material in particle form deposited in the step e) of depositing for making the surface protective coating 3 consists of 10% to 17% by weight of iron (Fe), from 2.5% to 5.8% by weight of chromium (Cr), 0.6% to 2.2% by weight of aluminum (Al) and the remainder by tungsten carbide (WC).

According to a preferred embodiment, the surface protective coating 3 which is obtained consists of 85% by weight of tungsten carbide (WC) and 15% by weight of iron (Fe), chromium (Cr) and aluminum (Al).

Advantageously, the brake disc is provided with a portion suitable to fix the disc to a vehicle, consisting of an annular portion 4 which is arranged centrally with respect to the disc 1 and concentric to the braking band 2. The fixing portion 4 supports the connection element 5 to the wheel hub (i.e. to the bell). The bell may be formed in one piece with the annular fixing portion (as shown in the accompanying figures) or may be formed separately and then fixed by means of appropriate connecting elements to the fixing portion.

The annular fixing portion 4 can be made of the same material as the braking band, i.e. of grey cast iron, or steel. The bell 5 can also be made of grey cast iron or other appropriate material. In particular, the entire disc (i.e. braking band, fixing portion and bell) can be made of grey cast iron.

Preferably, the braking band 2 is made by casting. Similarly, when they are made of grey cast iron, the fixing portion and/or the bell may be produced by casting.

The annular fixing portion can be made in a single body with the braking band (as shown in the accompanying figures) or can be made as a separate body, mechanically connected to the braking band.

Advantageously, the material in particle form which is deposited in step d) for forming the base protective coating 30 has a particle size between 5 and 40 µm. The choice of such range of values allows to confer high properties of deposition surface density and adhesion capacity to the nitrocarburized layer 300.

Preferably, the base protective coating 30 has a thickness between 20 µm and 80 µm, and preferably equal to 50 µm. The choice of such a range of values allows to achieve an optimal balance between the efficacy of the anti-oxidizing protective action and limitation of the thermal expansions on the coating itself. In other words, if the thickness of the base protective coating 30 were less than 20 µm, there would not be a sufficient anti-oxidizing protective action. A thickness greater than 80 µm, on the other hand, could lead over time to an imperfect adhesion due to thermal expansions which occur during the life cycle of a disc brake.

Within the aforesaid range of thicknesses, the base protective coating 30 can perform the aforementioned "damper" effect which helps preserve the integrity of the surface protective coating 3.

Advantageously, the material in particle form which is deposited in step e) for forming the surface protective coating 3 has a particle size between 5 and 45 µm. The choice of such a range of values allows to confer high properties of density, hardness and limited porosity to the coating.

Preferably, the surface protective coating 3 has a thickness between 30 µm and 90 µm, and preferably equal to 60 µm. The choice of such a range of values allows to achieve an optimal balance between the consumption of the protective layer and the limitation of the thermal expansions on the coating itself. In other words, if the thickness of the protective coating were less than 20 µm, in case of wear, it would be totally removed in an excessively short time. A thickness greater than 90 µm, on the other hand, could lead over time to an imperfect adhesion due to thermal expansions which occur during the life cycle of a disc brake.

As mentioned above, the thickness of the two protective coatings 3 and 30 is calculated in relation to the portions of the coating above the rough state. These are therefore minimum thickness values which do not take into account the thickness of the coating which may be used to fill the dips/pits of the roughness.

As a whole, as diagrammatically shown in FIG. 3, the two protective coatings 3 and 30 completely fill the roughness of the braking surface and develop on the rough profile with layers of thickness preferably within the intervals specified above.

As already mentioned, both the material which forms the base protective coating 30 (chromium carbide ($Cr_3C_2$) and nickel-chromium (NiCr), or nickel-chromium (NiCr), iron (Fe), molybdenum (Mo), cobalt (Co), manganese (Mn) and aluminum (Al)), and the material forming the surface protective coating 3 (tungsten carbide, iron, chromium and aluminum) are deposited in particle form respectively on the nitrocarburized layer 300 and on the base protective coating 30, preferably by means of an HVOF technique or an HVAF technique or a KM technique.

These three deposition techniques are well known to those skilled in the art and will therefore not be described in detail.

HVOF (High-Velocity Oxygen Fuel) is a powder spray deposition technique which uses a spray device provided with a mixing and combustion chamber and with a spray nozzle. Oxygen and fuel are fed to the chamber. The hot combustion gas which forms at pressures close to 1 Mpa crosses the convergent-divergent nozzle conveys the material in powder to hypersonic speed (i.e. higher than Mach 5). The material in powder to be deposited is injected into the hot gas flow, in which it melts rapidly and is accelerated to a speed of the order of 1000 m/s. Once it has impacted onto the deposition surface, the molten material cools rapidly, and a very dense and compact structure is formed by virtue of the high kinetic energy impact.

The HVAF (High-Velocity Air Fuel) deposition technique is similar to the HVOF technique. The difference is in that air instead of oxygen is supplied into the combustion chamber in the HVAF technique. Therefore, the temperatures involved are lower than those of the HVOF technique. This allows better control of the thermal modification of the coating.

The KM (Kinetic Metallization) deposition technique is a solid-state deposition process in which metal powders are sprayed through a sonic deposition nozzle in two steps which accelerates and triboelectrically charges the metal particles in an inert gas flow. Thermal energy is supplied in the carrier stream. The potential energy of the compressed inert gas flow and of the thermal energy is converted into kinetic energy of the powders in the process. Once accelerated at high speed and electrically charged, the particles are directed against the deposition surface. The high-speed collision of the metal particles with such surface causes large deformation of the particles (approximately 80% in a direction perpendicular to the impact). This deformation results in an enormous increase in the surface area of the particles. As an effect of the impact, intimate contact is formed between the particles and the deposition surface, which leads to the formation of metallic bonds and a coating having a very dense and compact structure.

Advantageously, as an alternative to the three deposition techniques listed above, which share the fact of being high kinetic energy impact deposition techniques, there are other techniques which exploit different deposition methods, but which can generate coatings having a very dense and compact structure.

The combination of the HVOF, HVAF or KM deposition techniques and of the chemical components used for forming the two protective coatings—base 30 and surface 3—allows to obtain protective coatings with high bond strength on lower material on which they are deposited.

In particular, the aforesaid combination allows to obtain a high anchoring degree both of the base coating 30 on the nitrocarburized layer 300 (possibly with oxidized top layer 330), and of the surface coating 3 on the base protective coating 30.

The absence of free carbon (C), preferably not present even in trace form in the final materials which form the two protective coatings, helps to reduce the risk of detachments. Indeed, it has been found that in the case of application of the coating with thermal spray techniques, a cause of the detachment of conventional protective coatings from discs made of aluminum or aluminum alloy or of grey cast iron or steel is the presence of free carbon in the protective coating. Indeed, the carbon tends to burn, combining with the oxygen incorporated in the protective coating being formed. This leads to the formation of micro-bubbles within the coating, which can prevent an adequate adhesion of the coating onto the disc, thereby facilitating its removal.

According to a particularly preferred embodiment of the invention, both the material in particle form deposited in step b) of depositing for making the base protective coating 3 and the material in particle form deposited in step d) of depositing for making the surface protective coating 30 are deposited by means of HVOF (High-Velocity Oxygen Fuel)

technique. Indeed, it has been found that this technique—in particular, if associated with a braking band or with an entire disc made of grey cast iron—allows to achieve a combined protective coating (base+surface) which offers the best compromise in terms of wear resistance and tribological performance.

More in detail, according to experimental tests performed, with respect to the (preferred) HVOF (High-Velocity Oxygen Fuel) technique, the HVAF (High-Velocity Air Fuel) technique allows to obtain compact and uniform coatings with regular thickness close to nominal values. The coatings made with HVOF are less compact, have a "spongy" appearance and variable thickness.

The thermal shock tests conducted on samples having coatings made by HVOF and HVAF showed damage which affected only the WC+Fe, Cr, Al surface protective coating, found on all specimens and which consists in a micro-cracking of the coating. Such micro-cracking, however, appears to be more pronounced in specimens with coatings made by HVAF technique, probably due to the greater rigidity of the application. This makes the HVOF technique more preferable.

In all cases, the base protective coating made of $Cr_3C_2$+Ni or of NiCr+Fe+Mo+Co+Mn+Al did not suffer consequences following the thermal shock test, always being dense, perfectly adhered to the cast iron and free from cracks.

As mentioned above, the base protective coating 30 and the surface protective coating 3 cover at least one of the two braking surfaces of the braking band.

The whole of the base protective coating 30 and of the surface protective coating 3 will be identified globally hereinafter as "combined protective coating" 3, 30.

Preferably, as shown in FIG. 2, the disc 1 is provided with a "combined protective coating" 3, 30 which covers both braking surfaces 2a and 2b of the braking band 2.

In particular, the combined protective coating 3, 30 may cover only the braking band, on a single braking surface or on both.

According to solutions of embodiments not shown in the accompanying figures, the combined protective coating 3, 30 may extend also to other parts of the disc 1 as the annular fixing portion 4 and the bell 5, up to cover the entire surface of the disc 1. In particular, the combined protective coating 3, 30 may cover—in addition to the braking band—only the fixing portion or only the bell. The choice is substantially dictated by reasons of appearance, in order to have a uniform coloring and/or finishing on the entire disc or between some portions of it.

Advantageously, the particle material depositing for the formation of the combined protective coating 3, 30 may be performed in a differentiated manner on the surface of the disc at least in terms of the coating thickness.

At the braking band, the combined protective coating 3, 30 can be made with the same thickness in the two opposite braking surfaces. Alternative solutions can be provided in which the combined protective coating 3, 30 is made by differentiating the different thicknesses between the two braking surfaces of the braking band.

According to a particularly preferred embodiment, the step d) of depositing for forming the base protective coating 30 comprises two or more distinct deposition stages of the material in particle form on the surface itself to form the protective coating.

In more detail, said step d) of deposition comprises:
a first deposition stage of material in particle form to create a first layer of the base protective coating 30 directly on the disc; and
a second deposition step of the material in particle form to create a second layer of the base protective coating on the first layer.

As will be clarified below, the second finishing layer allows to adjust the surface finish of the base protective coating 3.

The division of step d) of depositing into two stages allows, in particular, to differentiate at least the particle size of the material in particle form used in the various stages. This makes the step d) of depositing more flexible.

Advantageously, the material in particle form deposited with the first deposition stage has a particle size greater than that deposited with the second deposition stage. In particular, the material in particle form deposited with the first deposition stage has a particle size between 30 and 40 µm, while the material in particle form deposited with the second deposition stage has a particle size between 5 and 20 µm.

Making the base protective coating 30 in two distinct deposition stages, using a coarser particle size for the formation of the first layer and a finer particle size for the formation of the second layer (with finishing function), allows to obtain a coating which already at the end of the deposition has the required surface finish features, as a function of the subsequent deposition of the surface protective coating 3. Such desired surface finishing characteristics can be obtained without needing to grind and/or perform other surface finishing operations for the coating. The particles deposited with the second stage fill the coarse roughness on the surface of the base layer. Advantageously, the surface finishing level of the coating can be adjusted by adjusting the particle size of the particles deposited with the second stage.

Preferably, the thickness of the first layer of the base protective coating 30 is between 2/4 and 3/4 of the total thickness of the coating, while the thickness of the second layer of the base protective coating 4 is between 1/4 and 2/4 of the total thickness of the coating.

According to a particularly preferred embodiment of the method, the step e) of depositing the particle material (WC+Fe+Cr+Al) which forms the surface protective coating 3 comprises two or more distinct deposition stages of the particle material onto the same surface to form the protective coating.

In more detail, said step e) of deposition comprises:
a first deposition stage of the material in particle form to create a first layer of the coating directly on the base protective coating 30; and
a second deposition stage of the material in particle form to create a second layer on the first layer of surface protective coating 3.

Preferably, surface protection layer 3 is subjected to a step of surface finishing to achieve the desired final degree of roughness.

Alternatively, the surface finish of protective layer 3 may be obtained by working directly on the deposition modes of the coating itself 3.

More in detail, similarly to what is envisaged in step d) of depositing the base coating, also the division of step e) of depositing the particle material which forms the surface protective coating 3 into two or more stages, in particular, allows to differentiate at least the particle size of the particle material used in the various steps. This makes the step e) of depositing more flexible.

Advantageously, the particle material deposited with the first deposition stage has a particle size which is greater than that deposited with the second deposition stage. In particular, the particle material deposited with the first deposition stage has a particle size between 30 and 40 µm, while the particle material deposited with the second deposition stage has a particle size between 5 and 20 µm.

Making the surface protective coating 3 with two distinct deposition stages, using a coarser particle size for forming the base layer and a finer grain size for forming the finishing layer, allows to obtain a surface protective coating 3 which already at the end of the deposition has the required surface finishing features, without the need for grinding and/or performing other surface finishing operations for the coating. The particles deposited in the second stage fill the coarse roughness on the surface of the base layer. Advantageously, the surface finishing level of the surface protection coating 3 can be adjusted by adjusting the particle size of the particles deposited in the second stage.

In particular, by using particles with a particle size of 30 to 40 µm for the first stage and particles with a particle size of 5 and 20 µm for the second stage, the surface protective coating 3 has at the finishing layer a surface roughness Ra in the range between 2.0 and 3.0 µm.

Preferably, the thickness of the first layer of the surface protective coating 3 is between 2/4 and 3/4 of the total thickness of the coating, while the thickness of the second layer of the surface protective coating 3 is between 1/4 and 2/4 of the total thickness of the coating.

Overall, the combination of the HVOF, HVAF or KM deposition techniques of the particle material, of the chemical components used and of the depositing modes in multiple stages allows to obtain a coating with a limited level of surface roughness, particularly adapted for the purposes of use of the brake disc 1.

Comparative tests between the following discs were performed:

A) a disc brake made of grey cast iron with a "combined" protective coating according to the invention, made by the HVOF technique, with 50 µm thick base protective coating (Cr3C2+NiCr) and 60 µm thick surface protective coating (WC+Fe+Cr+Al); the base protective coating was deposited on the disc on a nitrocarburized layer having a depth of 15 µm and hardness values higher than 300 HV in microhardness; the nitrocarburized layer included an oxidized top layer comprising magnetite $Fe_3O_4$ with a thickness of 5 µm; the nitrocarburized layer was made on the braking surface, which had previously undergone a treatment adapted to increase the roughness thereof; and B) a grey cast-iron brake disc with a "combined" protective coating, similar to that of the invention, but made directly on the disc without a nitrocarburized layer;

The two discs were subjected to the usual dynamic bench tests (run-in, AK Master and wear).

Such tests showed that the test conditions being equal, the disc A according to the invention has a durability comparable in terms of wear to that of the disc B.

Also from the point of view of tribological behavior (friction, fading, run-in), the test conditions being equal, the disc according to the invention has a performances substantially comparable to those of a traditional disc B.

The two discs were also subjected to a series of resistance tests in the presence of combined environmental and thermomechanical stresses.

As mentioned, such tests have shown that the disc according to the invention has performances better than those of the disc B in terms of resistance in presence of environmental stresses (thermomechanical shocks and corrosive agents).

In greater detail, the two discs were subjected to a test program which includes the repetition of combined dynamic bench tests (the disc was subjected to different cycles of braking, each with multiple consecutive braking operations) and tests in corrosive environment (salt spray and condensation water test: disc and brake pads were kept in salt spray and in an environment with a high degree of moisture with high-temperature excursions).

At the end of set repetitions, disc B exhibited a generalized removal of the protective coating, while disc A had only a minimal localized detachment of the protective coating.

As can be appreciated from the description above, the disc brake and the method for making such disc brake according to the invention allows to overcome the disadvantages of the prior art.

Indeed, the brake discs made according to the invention result to be not subject to flaking or are subject to it to a much lesser degree than the known solutions (so as to ensure in time a wear resistance).

The brake disc coated according to the invention, provided with a nitrocarburized layer, has shown similar wear resistance and tribological behavior under normal environmental conditions compared to similar coated discs without a nitrocarburized layer.

It was also verified that the brake disc coated according to the invention has the best performance in terms of resistance in the presence of environmental stresses (thermal shocks and salt attacks).

The brake disc 1 is also generally cost-effective to make.

In order to meet contingent, specific needs, those skilled in the art can make several changes and variations to the disc and brake disc described above, all contained within the scope of the invention as defined by the following claims.

The invention claimed is:

1. A method for making a brake disc comprising the following operating steps:
   (a) preparing a brake disc, comprising a braking band provided with two opposite braking surfaces, each of which defines at least partially one of the two main faces of the disc, the braking band being made of grey cast iron or steel;
   (b) subjecting at least one of said braking surfaces to a working process designed to increase their surface roughness;
   (c) nitrocarburizing said braking surface with increased surface roughness obtaining on said surface a nitrocarburized surface layer;
   (d) depositing on said nitrocarburized surface layer a material in particle form consisting of:
      chromium carbide (Cr3C2) and Nickel-Chromium (NiCr), or
      Nickel-Chromium (NiCr), Iron (Fe), Molybdenum (Mo), Cobalt (Co), Manganese (Mn) and Aluminum (Al),
   with a spray deposition technique, preferably HVOF (High Velocity Oxygen Fuel) technique or HVAF (High Velocity Air Fuel) technique or KM (Kinetic Metallization) technique, forming a base protective coating which covers at least one of the two braking surfaces of the braking band with the interposition of said nitrocarburized layer; and
   (e) depositing on said base protective coating a material in particle form consisting of tungsten carbide (WC), iron (Fe), chromium (Cr) and aluminum (Al), with a spray deposition technique, preferably HVOF (High Velocity Oxygen Fuel) technique, or HVAF (High Velocity Air Fuel) technique or KM (Kinetic Metallization) technique, forming a surface protective coating which consists of tungsten carbide (WC) and iron (Fe), chromium (Cr) and aluminum (Al) and which covers at least one of the two braking surfaces of the braking band.

2. The method according to claim 1, wherein the working process carried out in step b) is carried out to generate on said surface a rough profile defined by a plurality of protuberances extending orthogonally to said surface with a height between 30 and 200 μm and spaced apart from each other—in a radial or circumferential direction with respect to the center of the braking band—with a pitch between 300 and 2000 μm, preferably said protuberances having an undercut angle with respect to the direction orthogonal to the surface from which they extend, preferably said undercut angle being between 2° and 15°.

3. The method according to claim 1, wherein said step b) is carried out with working process by chip removal or by laser incision or by plastic deformation.

4. The method according to claim 1, wherein said step b) is carried out with a working process by fine turning with roughness Ra between 0.8 and 2.

5. The method according to claim 1, wherein said step b) is carried out with working process by sandblasting with roughness Rz between 10 and 80.

6. The method according to claim 1, wherein said nitrocarburization step c) is obtained by a ferritic nitrocarburization treatment.

7. The method according to claim 1, wherein said nitrocarburization step c) is carried out so that the nitrocarburized surface layer has a depth between 2 and 30 μm and hardness values higher than 300 HV in microhardness.

8. The method according to claim 1, wherein said nitrocarburization step c) is followed by a post-oxidation step f) of the nitrocarburized layer, carried out before said deposition step d), to obtain an oxidized top layer comprising magnetite (Fe3O4), preferably said oxidized top layer comprising magnetite (Fe3O4) having a thickness between 2 and 10 μm.

9. The method according to claim 1, wherein the material in particle form deposited in the deposition step d) to make the base protective coating consists of 65% to 95% by weight of chromium carbide (Cr3C2) and for the remaining part of Nickel-Chromium (NiCr).

10. The method according to claim 1, wherein the material in particle form deposited in the deposition step d) to make the base protective coating is based on Nickel-Chromium (NiCr) with a content by weight of Nickel (Ni) from 40% to 75% and with a content by weight of Chromium (Cr) from 14% to 30%, and for the remainder of Iron (Fe), Molybdenum (Mo), Cobalt (Co), Manganese (Mn) and Aluminum (Al).

11. The method according to claim 1, wherein the material in particle form deposited in the deposition step d) to make the surface protective coating consists of 75% to 87% by weight of tungsten carbide (WC) and for the remainder of iron (Fe), chromium (Cr) and aluminum (Al), preferably consisting of 10% to 17% by weight of iron (Fe), 2.5% to 5.8% by weight of chromium (Cr), 0.6% to 2.2% by weight of aluminum (Al) and the remainder of tungsten carbide (WC), even more preferably of 85% by weight of tungsten carbide (WC) and of 15% by weight of iron (Fe), chromium (Cr) and aluminum (Al).

12. The method according to claim 1, wherein the base protective coating has a thickness between 20 μm and 80 μm, and preferably of 50 μm, said thickness referring to a portion of coating above said rough profile.

13. The method according to claim 1, wherein the surface protective coating has a thickness between 20 μm and 90 μm, and preferably equal to 60 μm, said thickness referring to a portion of coating above said rough profile.

14. A brake disc for a disc brake, comprising a braking band, provided with two opposite braking surfaces, each of which defines at least partially one of the two main faces of the disc, the braking band consisting of a base metal selected from grey cast iron or steel, wherein said brake disc is provided with:
    a base protective coating covering at least one of the two braking surfaces of the braking band, said base protective coating consisting of chromium carbide (Cr3C2) and Nickel-Chromium (NiCr), or of Nickel-Chromium (NiCr), Iron (Fe), Molybdenum (Mo), Cobalt (Co), Manganese (Mn) and Aluminum (Al), and being obtained by deposition with a spray deposition technique, preferably HVOF (High Velocity Oxygen Fuel) technique, or HVAF (High Velocity Air Fuel) technique or KM (Kinetic Metallization) technique; and
    a surface protective coating covering at least one of the two braking surfaces of the braking band, said surface protective coating consisting of tungsten carbide (WC), iron (Fe), chromium (Cr) and aluminum (Al) and being obtained by depositing on the base protective coating (30) tungsten carbide (WC), iron (Fe), chromium (Cr) and aluminum (Al) in particle form with a spray deposition technique, preferably HVOF (High Velocity Oxygen Fuel) technique or HVAF (High Velocity Air Fuel) technique or KM (Kinetic Metallization) technique, and wherein the braking surface coated by said base protective coating is defined by a nitrocarburized layer of said base metal and has a rough profile in radial or circumferential cross-section with respect to the center of the braking band.

15. The brake disc according to claim 14, wherein said rough profile is defined by a plurality of protuberances that extend orthogonally to said surface with a height between 30 and 200 μm and are spaced apart from each other—in a radial or circumferential direction with respect to the center of the braking band—with a pitch between 300 and 2000 μm, preferably said protuberances having an undercut angle with respect to the direction orthogonal to the surface from which they extend, preferably said undercut angle being between 2° and 15°.

16. The brake disc according to claim 14, wherein said nitrocarburized layer is obtained by a ferritic nitrocarburization treatment of the base metal.

17. The brake disc according to claim 14, wherein said nitrocarburized layer has a depth between 2 and 30 μm and hardness values higher than 300 HV in microhardness.

18. The brake disc according to claim 14, wherein said nitrocarburized layer comprises an oxidized top layer comprising magnetite (Fe3O4) acting as an interface with said base protective layer, preferably said oxidized top layer comprising magnetite (Fe3O4) having a thickness between 2 and 10 μm.

19. The brake disc according to claim 14, wherein the base protective coating consists of:
    65% to 95% of chromium carbide (Cr3C2) and the remainder of Nickel-Chromium (NiCr); or
    nickel-Chromium (NiCr) with a content by weight of Nickel (Ni) from 40% to 75% and a content by weight of Chromium (Cr) from 14% to 30%, and the remainder of Iron (Fe), Molybdenum (Mo), Cobalt (Co), Manganese (Mn) and Aluminum (Al).

20. The brake disc according to claim 14, wherein the surface protective coating consists of 75% to 87% by weight of tungsten carbide (WC) and the remainder of iron (Fe), chromium (Cr) and aluminum (Al), and preferably of 85% by weight of tungsten carbide (WC) and of 15% by weight of iron (Fe), chromium (Cr) and aluminum (Al).

21. The brake disc according to claim 14, wherein the base protective coating has a thickness between 20 μm and 80 μm, and preferably 50 μm, said thickness referring to a coating portion above said rough profile.

22. The brake disc according to claim 14, wherein the surface protective coating has a thickness between 20 μm and 90 μm, and preferably equal to 60 μm, said thickness referring to a coating portion above said rough profile.

* * * * *